RECORD CHANGER SPINDLE
Filed Dec. 1, 1949 3 Sheets-Sheet 1
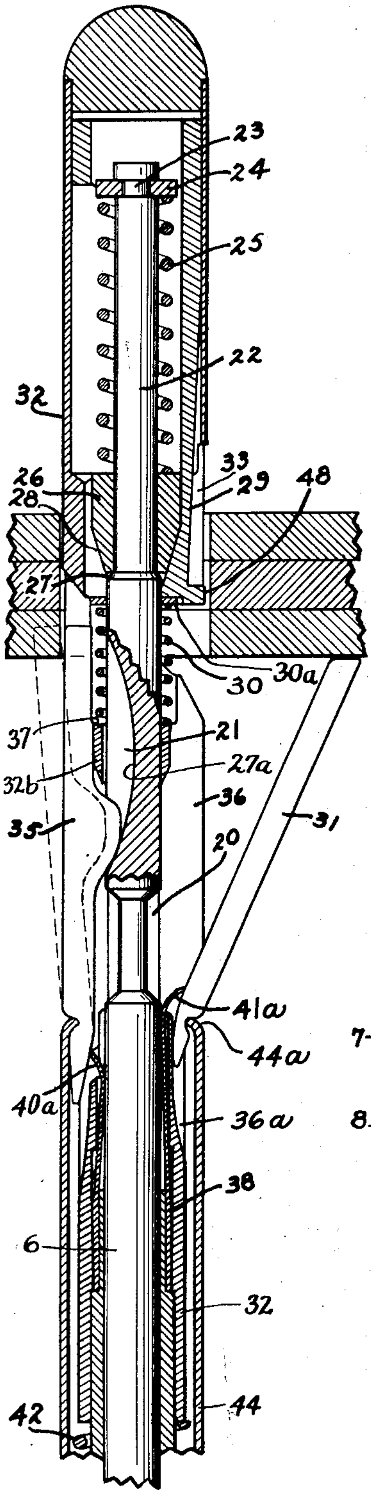
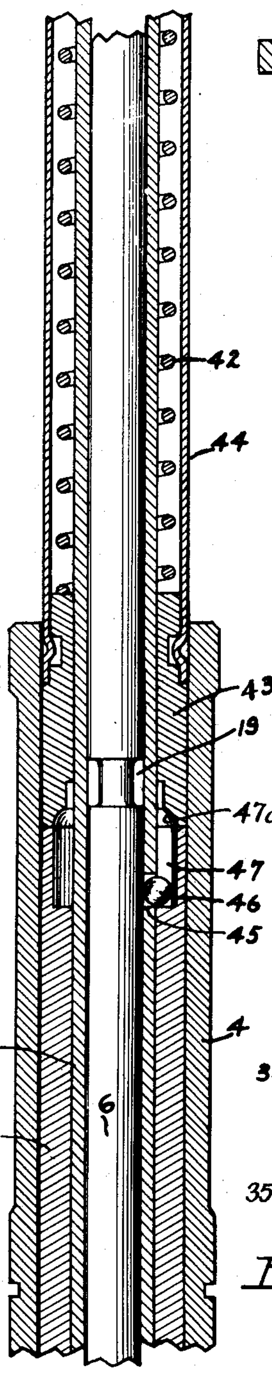
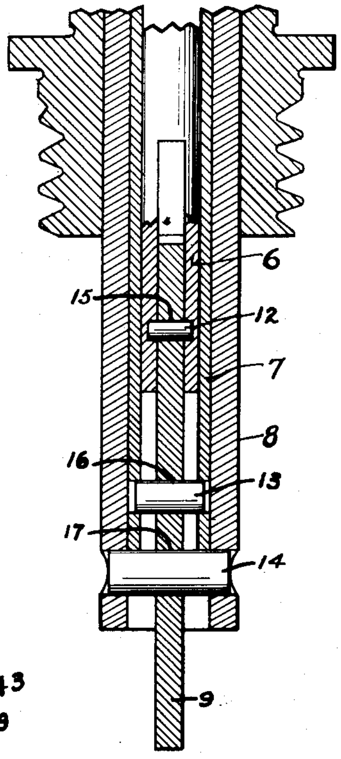
FIG. 1
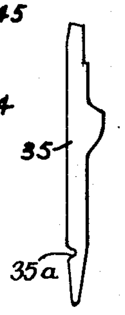
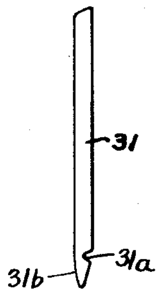
FIG. 2 FIG. 3
INVENTORS
JAMES L. D. MORRISON
WALTER MILLER
BY
J.B. Dickman, Jr.
ATTORNEY Oct. 28, 1952 W. MILLER ET AL 2,615,720

RECORD CHANGER SPINDLE

Filed Dec. 1, 1949 3 Sheets-Sheet 2

INVENTORS
JAMES L. D. MORRISON
WALTER MILLER
BY
J. B. Dickman Jr
ATTORNEY

Oct. 28, 1952

W. MILLER ET AL 2,615,720

RECORD CHANGER SPINDLE

Filed Dec. 1, 1949

3 Sheets-Sheet 3

INVENTORS
JAMES L. D. MORRISON
WALTER MILLER

BY J. B. Dickman, Jr.
ATTORNEY

Patented Oct. 28, 1952 2,615,720

UNITED STATES PATENT OFFICE 2,615,720

RECORD CHANGER SPINDLE

Walter Miller and James L. D. Morrison, Benton Harbor, Mich.

Application December 1, 1949, Serial No. 130,442

6 Claims. (Cl. 274—10)

The present invention relates to record changers for phonographs and the like, where records of mixed sizes may be stacked up for consecutive feeding to the turntable of the machine after each record is played. More specifically this invention comprises record changing means incorporated within the spindle, on the upper portion of which the records to be played are stacked up.

An object of the present invention is to provide means operating within the spindle, for feeding the records one at a time from the bottom of the stack placed on the upper portion of the spindle, after the previously dropped record has been played.

A further object of the present invention is to hold the stack of records on the upper portion of the spindle by means of the three carrier fingers extending angularly from pivots in said spindle to support the stack at a level where the lowermost record is opposite the offset portion of said spindle.

A still further object of the present invention is to provide an off-setting finger pivoted in said spindle and normally nested within a slot in said spindle, and means in said spindle for actuating said finger to offset the lowermost record in the stack so as to form a stop for a set of holding fingers provided in the upper portion of said spindle having friction surfaces expandable outwardly within the center hole of the record resting on the lowermost record, so as to support said record and those above it in the stack while the lowermost record is permitted to drop to the turntable.

A still further object of the present invention is to provide holding fingers with sharp external lower edges, and means for lowering said fingers to the top of the lowermost record after it has been offset on the spindle, then pressing said holding fingers outwardly so as to wedge said sharp edges under the record resting on the offset record, thereby causing a positive grip under the remaining stack before the lowermost record is allowed to drop.

A still further object of the present invention is to provide means in said spindle to then lower said carrier fingers slightly, then snap them into respective slots provided for them in said spindle allowing the separated record to drop freely down the spindle to the turntable, and means for then springing said carrier fingers out into supporting position, and raising them to their former level while releasing the pressure on said holding fingers to drop the stack to the carrier fingers while slightly raising the holding fingers to their original position.

A further object is to provide an operating cam means below said turntable for operation of the means within said spindle in timed relation to the operation of the tone arm during the record changing cycle.

These and other more specific objects will appear more clearly in the following detailed description of one form of the record changer spindle and operating means built in accordance with the present invention, having reference to the accompanying drawings, wherein:

Figure 1 is a sectional view of the spindle broken in three parts so as to show the entire assembly in one figure.

Figure 2 is a detail reduced view of the offsetting finger.

Figure 3 is a detail reduced view of one of the carrier fingers.

Figures 4, 5, 6, 7, 8, 9, 10, 11:
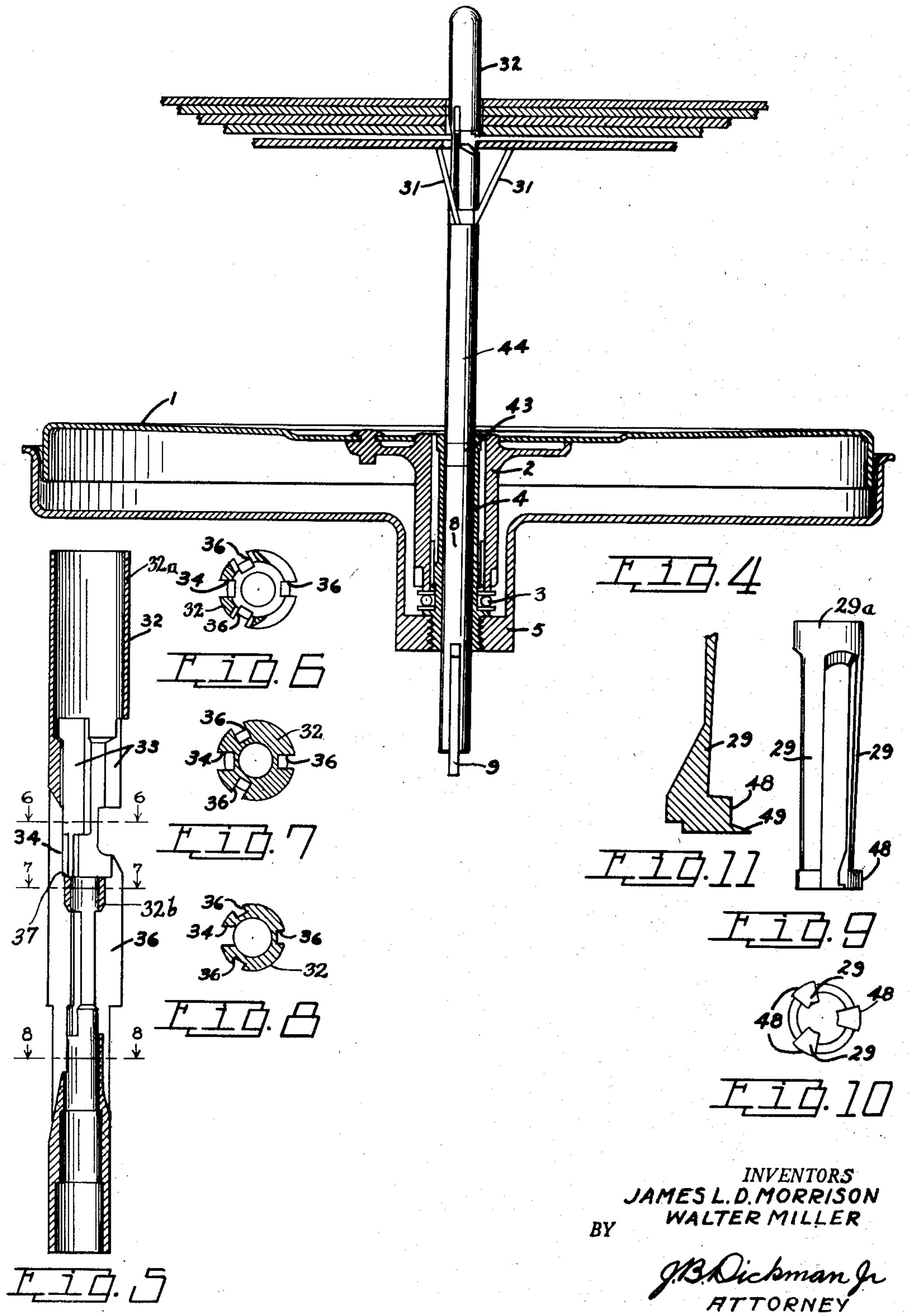
Figure 4 is an assembly view, partly in section, of the turntable and spindle with a stack of records on the upper portion thereof.
Figure 5 is a sectional view of the stationary portion of the spindle.

Figures 6, 7 and 8 are sectional views taken on the lines 6—6, 7—7 and 8—8 respectively of Figure 5.

Figure 9 is an elevational view of the holding fingers.

Figure 10 is a bottom view thereof.

Figure 11 is a detail sectional view of the lower end of one of the holding fingers.

Figures 12, 13, 14, 15:
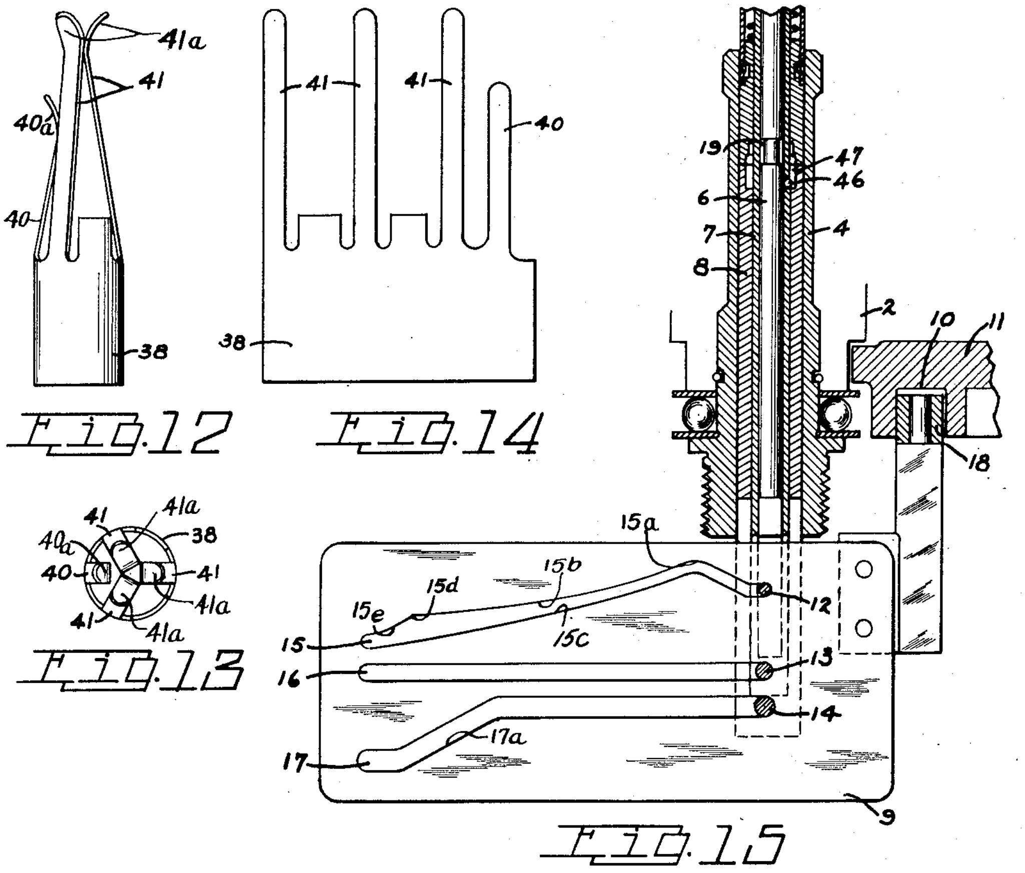

Figures 12 and 13 are elevational views respectively of the flat springs for biasing the carrier and offsetting fingers.

Figure 16:
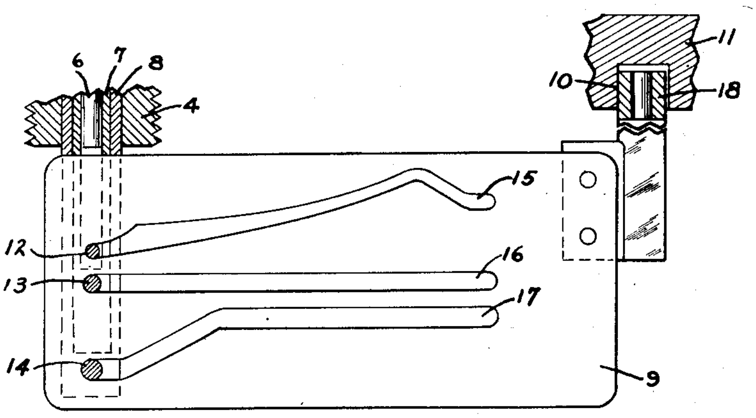

Figure 14 is a blank of sheet spring material stamped out to form the above springs, and Figures 15 and 16 are elevational views of the operating cam plate for actuating the movable spindle portions to operate the fingers during the record changing cycle, the cam plate being shown in its extreme positions in the two figures.

Referring now to the figures more specifically, the turntable 1 is mounted on a rotary sleeve 2 supported by a thrust bearing 3 at the base of the spindle supporting sleeve 4 which is fixedly positioned in the casing 5 of the phonograph base in axial alignment with the turntable 1.

The spindle comprises a tubular staff 7, a concentric vertically movable sleeve 8 and a concentric vertically movable plunger 6. The lower ends of the staff 7, sleeve 8 and plunger 6 are provided with transversely extending aligning slots for the reception of a horizontally movable cam plate 9 which is moved periodically by an eccentric roller slot 10 in horizontal gear 11 which causes the roller 18 to move first to the right, then to the left, thus moving the cam plate which is guided in any suitable manner to slide horizontally through the slots of the spindle parts as will be readily understood upon reference to Figures 15 and 16. Obviously any other means for moving the cam plate may be employed.

Formed in the cam plate 9 intermediate the upper and lower edges there is an elongated longitudinal slot 16 in which is received a cross pin 13, opposite ends of which extend into the staff 7 so that as the cam plate 9 is moved, the staff 7 will remain substantially stationary. Formed in the cam plate 9 immediately below the slot 16 is a cam slot 17 which is horizontal throughout the major portion of its length but inclines downwardly as at 17*a* adjacent one end. A cross pin 14 extends through the slot 17 and into the sleeve 8 so that as the plate 9 is moved to the right as viewed in Figure 15 the sleeve 8 will be moved downwardly on the staff 7. A cam slot 15 is formed in the cam plate 9 above the slot 16 and is substantially in the form of an inverted V with the apex 15*a* disposed near the end of the cam plate remote from the downwardly inclined portion 17*a* of the cam slot 17. The cam slot 15 inclines downwardly toward the slot 16 as it recedes from the apex 15*a* and its upper wall 15*b* diverges from its lower wall 15*c* to a point 15*d* near the end thereof remote from the apex 15*a*. From the point 15*d*, the upper wall of the cam slot 15 converges rapidly as at 15*e* toward the lower wall 15*c* as the end of the slot is approached. Extending through the cam slot 15 into the plunger 6 is a cross pin 12 so that as the plate 9 is moved to the right when viewed as in Figure 15, the plunger 6 will first be moved upwardly with a rather rapid motion and then moved downwardly at a progressively decreasing speed until the cam face 15*e* is encountered when the downward movement of the plunger 6 will be accelerated as the end of the travel of the plate 9 is approached. With the reverse movement of the plate 9 however the elevating of the plunger 6 will be only slightly accelerated until the apex of the V is reached when the plunger 6 will move downwardly at a speed in excess of that at which it was moved upwardly.

Mounted on the plunger 6 for vertical sliding movement relative thereto is a cone 26, the sides of which converge as the lower end is approached, and bearing on the upper end of the cone is a compression coiled spring 25, the upper end of which bears against the under side of a stop collar 24 carried by the plunger 6 adjacent the upper end thereof. Carried by the plunger 6 in spaced relation to the upper end thereof is an annular stop shoulder 27 which limits the downward movement of the cone 26 under the influence of the spring 25. Formed in the plunger 6 slightly below the shoulder 27 is an elongated longitudinally disposed groove 21, the bottom surface of which is curved as at 21*a* to form a cam surface, the purpose of which will hereinafter appear, and formed in the plunger 6 immediately below the lower end of the groove 21 is a relatively wide annular groove 20 in which are received the spring tongues of the carrier fingers to be more fully described.

An annular groove 19 is formed in the plunger 6 intermediate the groove 20 and the cam plate 9 for a purpose to be more fully hereinafter described.

Mounted on the staff 7 and extending upwardly therefrom in concentric relation to the plunger 6 is a a cage 32, the upper end 32*a* of which is of a diameter substantially equal to the diameter of the sleeve 8 and an intermediate portion 32*b* having a diameter only slightly greater than that of the plunger 6. Formed in the upper end 32*a* of the cage 32 and opening through the lower end thereof are circumferentially spaced elongated longitudinal slots 33 for accommodating the lower ends of the record stack holding fingers to be more fully hereinafter described and formed in the cage member 32 below the upper end 32*a* and in circumferentially spaced relation to the slots 33 is an elongated longitudinally extending slot 34 through which works the record offsetting finger to be more fully hereinafter described. Opening through the side of the cage 32 and below the upper end 32*a* and in circumferentially spaced relation to each other and to the slot 34 are slots 36 in which are accommodated the record carrier fingers to be more fully hereinafter described. Formed in the upper end 32*a* adjacent the lower ends of and in alignment with the slots 36 are cam grooves 36*a*, the bottom walls 36*b* of which curve outwardly toward the periphery of the cage as they recede from the slots 36 to form camming surfaces by which are retracted the record carrier fingers, to be more fully hereinafter described.

Seated on the upper end 37 of the intermediate portion 32*b* of the cage 32 is the lower end of a compression coiled spring 30 which surrounds the plunger 6 in concentric relation thereto and carries at its upper end an annulus 30*a* which is normally disposed slightly below the shoulder 27. A carrier ring 29*a* is mounted in the upper end 32*a* for vertical sliding movement relative thereto and depending from the carrier ring 29*a* are record holding fingers 29 carrying adjacent their lower ends outwardly extending record engaging lugs 48. The lower ends of the record holding fingers 29 rest on the annulus 30*a* and the fingers are thus yieldingly supported in place in the upper end 32*a*. These fingers 29 are so tensioned as to normally retain the lugs 48 within the peripheral confines of the cage 32 and upper end 32*a*. At the junction of the cage 32 with the upper end of the staff 7 a support collar 38 is provided having extending upwardly therefrom three spring fingers 41 and a single spring finger 40. These fingers are so tensioned as to converge as they recede from the collar 38 as will be readily understood upon reference to Figure 12. The ends of the fingers 41 and 40 are curved outwardly as at 41*a* and 40*a* respectively to form retainers for the carrier fingers and offsetting finger to be more fully hereinafter described.

Formed in the upper end of the sleeve 8 is a chamber 47 which communicates with the interior of the staff 7 through an opening 45 for the reception of a ball 46 and seated on the upper end of the sleeve 8 is a collar 43 having in its lower end a cavity 47*a*, the wall of said cavity being so shaped that when engaging the ball 46 the latter will be urged inwardly against the plunger to eventually enter the groove 19 therein and hold the sleeve 8, staff 7 and plunger 6 against relative movement. Carried by the upper end of the collar 43 and projecting upwardly therefrom is a tubular extension 44 having its upper end rolled inwardly as at 44*a* to form a bearing for circumferentially spaced carrier fingers 31 which are provided adjacent their lower ends with notches 31*a* in which is received the inturned portion 44a of the tubular extension 44. These fingers 31 work through the slots 36 of the cage 32 and are held in place on the tubular extension by the outwardly curved portions 41a of the fingers 41 and formed on the edge of each finger 31 on the side thereof remote from its notches 31a is a curved cam surface 31b for a purpose to be more fully hereinafter described.

An offsetting finger 35 having a notch 35a is seated on the inturned portion 44a of the tubular extension 44 and works in the slot 34 of the cage 32. The finger 35 is held in place on the tubular extension 44 by the outwardly curved portion 40a of the spring finger 40, and formed on the finger 35 intermediate the end of the edge remote from the notch 35a is an outwardly extending cam lug 35b which is received in the cam groove 21 and works against the curved bottom thereof as the plunger 6 moves relative to the sleeve. It is to be noted that the curved portion 40a of the spring tongue 40 bears on the finger 35 in such a manner as to yieldingly hold the cam lug 35b in contact with the bottom of the cam groove 21 whereas the curved portion 41a of the spring tongues 41 are so positioned relative to the fingers 31 as to yieldingly urge them outwardly and into expanded position as illustrated in the drawings.

A compression coiled spring 42 is seated on the collar 43 and engages the lower end of the cage 32 to effect a yielding connection between the cage 32 and the sleeve 8.

In operation with a stack of records supported on the spindle above the turn table 1 by the holding fingers 29 and assuming that the plate 9 is in the position illustrated in Figure 15, it will be evident that as the rollers 18 move the cam plate to the right, the pin 12 will move the plunger 6 upwardly thus moving the cone 26 upwardly and permitting the fingers 29 to contact and move the lugs 48 inwardly toward the axis of the spindle. Simultaneously the cam surface 21a of the groove 21 causes the cam 35b to move the upper end of the offsetting finger outwardly so that it bears against the wall of the center hole of the lowermost record in the stack. The entire weight of the record stack is thus transferred to the carrier fingers 31. Continuing its movement to the right the plate exerts downward pull on the pin 12 and plunger 6 to compress the spring 25 and cause the outer ends of the lugs 48 to frictionally engage the wall of the hole in the lowermost record in the stack. As the plate 9 approaches the end of its travel to the right the wall of the inclined portion 17a of the cam slot 17 exerts downward pull on the sleeve 8, causing the inturned portion 44a of the tubular extension 44 to exert downward pull on the fingers 31 to bring the cam surfaces 31b on the fingers 31 into engagement with the cam surfaces at the bottom of the grooves 36a and cause the fingers 31 to move inwardly within the peripheral confines of the spindle, to thus release the bottom-most record from the stack and permit it to fall onto the turntable 1. While the sleeve 8 has been moving downwardly, the plunger 6 also has been moving downwardly to bring the lugs 48 into a position to engage the underside of the record next to the one supported by the fingers 31. As the end of the downward movement of the sleeve is approached, the pin 12 encounters the curved cam surface 15e of the cam groove 15 to accelerate the descent of the plunger 6 so as to compress the spring 25 and yieldingly urge the cone 26 against the fingers 29 to thereby cause the lugs 48 to snap outwardly beneath the lowermost record in the stack as the record held by the fingers 31 is released. Obviously the rapid downward movement of the plunger will permit the offsetting finger 35 to move under the influence of the spring finger 40 toward the axis and within the peripheral confines of the spindle. As the plunger 6 approaches the lower end of the cam surface 15e of the cam slot in the plate 9, the sleeve 8 will have moved downwardly a distance sufficient to cause the wall of the cavity 47a to engage the ball 45 and under the yielding pressure of the spring 42 to yieldingly urge the ball 46 toward the axis of the plunger. Hence when the groove 19 in the plunger 6 aligns with the opening 45, the ball will partially enter the groove 19 and lock the plunger 6 and staff 7 against relative movement so that the holding fingers 29 will be expanded with the lugs 48 projecting beneath the lowermost record in the stack of records, while the offsetting finger 35 and the carrier fingers 31 remain within the peripheral confines of the spindle. As the plate 9 is moved by the roller 18 in a reverse direction, the sleeve 8 is elevated by the cam surface 17a at a greater speed than the speed of elevation of the plunger so as to lift the collar 43 out of engagement with the ball 46. This will allow the ball 46 to reenter the chamber 47 as the plunger 6 is elevated the parts will assume their initial position with the carrier fingers 31 expanded beneath the record stack ready for a repeat operation. As the fingers 31 approach their expanded condition the plunger 6 is moved upwardly to withdraw the cone 26 from its holding relation to the fingers 29 so that the latter may contract and withdraw the lugs 48 from record stack holding position and permit the stack to come to rest on the carrier fingers 31. The downward movement of the pin 12 in the short leg of the inverted V slot 15 causes the plunger 6 to move downwardly and bring the cone into position behind the holding fingers 29 to expand them and move the lugs 48 into frictional contact with the wall of the centering hole in the lowermost record in the stack and ready for a repeat operation.

What is claimed is:

1. In a record changing spindle of the type upon which a stack of records is supported axially above and in spaced relation to a turn table, a tubular staff extending axially through a turntable, an annular row of circumferentially spaced record holding lugs carried by the staff above the turn table for movement vertically relatively thereto, means carried by the staff and contacting said lugs for yieldingly contracting said lugs within the peripheral confines of the spindle, a plunger mounted in said staff for movement vertically thereto, a cone mounted on the plunger for movement relative thereto within the lug contracting means, a spring carried by the plunger and bearing on the cone to advance said cone into yielding contact with the lug contracting means and cause the lugs to expand as the plunger is lowered in relation to the staff, a sleeve encircling said staff and movable vertically relative thereto, yieldingly extended record carrier fingers carried by the sleeve below the holding lugs for supporting the stack of records when the lugs are contracted, and means carried by the staff and engaging the carrier fingers for contracting said carrier fingers when the sleeve moves downwardly relative to the staff.

2. The subject matter as defined in claim 1 in which the means for contracting the carrier fingers comprises a group of circumferentially spaced longitudinally curved cam faces carried by the staff.

3. In a record changing spindle of the type upon which a stack of records is supported axially above and in spaced relation to a turn table, a tubular staff extending axially through a turntable, an annular row of circumferentially spaced record holding lugs carried by the staff above the turn table for movement vertically relatively thereto, means carried by the staff and contacting said lugs for yieldingly contracting said lugs within the peripheral confines of the spindle, a plunger mounted in said staff for movement vertically thereto, a cone mounted on the plunger for movement relative thereto within the lug contracting means, a spring carried by the plunger and bearing on the cone to advance said cone into yielding contact with the lug contacting means and cause the lugs to expand as the plunger is lowered in relation to the staff, a sleeve encircling said staff and movable vertically relative thereto, yieldingly extended record carrier fingers carried by the sleeve below the holding lugs for supporting the stack of records when the lugs are contracted, means carried by the staff and engaging the carrier fingers for contracting said carrier fingers when the sleeve moves downwardly relative to the staff, and means below the turn table and engaging the plunger and the sleeve for moving the plunger and the sleeve relatively to the staff in timed relation to one another.

4. The subject matter as defined in claim 3, in which the plunger and sleeve moving means comprises an elongated plate mounted to slide longitudinally in a horizontal path, longitudinally extending cam tracks carried by said plate and pins connected to the plunger and to the sleeve and engaging the cam tracks whereby when the plate is moved horizontally the plunger and sleeve will move relative to one another.

5. In a record changing spindle of the type upon which a stack of records is supported axially above and in spaced relation to a turn table, a tubular staff extending axially through a turntable, an annular row of circumferentially spaced record holding lugs carried by the staff above the turn table for movement vertically relatively thereto, means carried by the staff and contacting said lugs for yieldingly contracting said lugs within the peripheral confines of the spindle, a plunger mounted in said staff for movement vertically thereto, a cone mounted on the plunger for movement relative thereto within the lug contracting means, a spring carried by the plunger and bearing on the cone to advance said cone into yielding contact with the lug contracting means and cause the lugs to expand as the plunger is lowered in relation to the staff, a sleeve encircling said staff and movable vertically relative thereto, yieldingly extended record carrier fingers carried by the sleeve below the holding lugs for supporting the stack of records when the lugs are contracted, means carried by the staff and engaging the carrier fingers for contracting said carrier fingers when the sleeve moves downwardly relative to the staff, an offsetting finger carried by the sleeve, means carried by the sleeve and engaging said offsetting finger to yieldingly urge said finger toward the axis of the spindle, said plunger having a cam groove therein above the sleeve and a cam on the offsetting finger for entering the groove and moving the finger against the effort of the yielding means.

6. In a record changing spindle of the type upon which a stack of records is supported axially above and in spaced relation to a turn table, a tubular staff extending axially through a turntable, an annular row of circumferentially spaced record holding lugs carried by the staff above the turn table for movement vertically relatively thereto, means carried by the staff and contacting said lugs for yieldingly contracting said lugs within the peripheral confines of the spindle, a plunger mounted in said staff for movement vertically thereto, a cone mounted on the plunger for movement relative thereto within the lug contracting means, a spring carried by the plunger and bearing on the cone to advance said cone into yielding contact with the lug contracting means and cause the lugs to expand as the plunger is lowered in relation to the staff, a sleeve encircling said staff and movable vertically relative thereto, yieldingly extended record carrier fingers carried by the sleeve below the holding lugs for supporting the stack of records when the lugs are contracted, means carried by the staff and engaging the carrier fingers for contracting said carrier fingers when the sleeve moves downwardly relative to the staff, said plunger having an annular groove therein intermediate the upper and lower ends of the sleeve, a detent carried by the staff intermediate the ends thereof for entering the groove in the plunger and means carried by the sleeve for yieldingly urging said detent against the plunger and into the groove.

WALTER MILLER.
J. L. D. MORRISON.

REFERENCES CITED

The following references are of record in the file of this patent:

UNITED STATES PATENTS

| Number | Name | Date |
|---|---|---|
| 2,328,052 | Butler | Aug. 31, 1943 |

FOREIGN PATENTS

| Number | Country | Date |
|---|---|---|
| 69,274 | Norway | May 28, 1945 |
| 64,649 | Denmark | July 22, 1946 |